Oct. 29, 1963    W. WITTE    3,109,132
MINIATURE BATTERY CHARGING CIRCUIT AND APPARATUS
FOR POCKET FLASHLIGHTS AND THE LIKE
Filed Sept. 5, 1957

Inventor:
Waldemar Witte

3,109,132
MINIATURE BATTERY CHARGING CIRCUIT AND APPARATUS FOR POCKET FLASHLIGHTS AND THE LIKE
Waldemar Witte, Steinbergerstrasse 2, Murrhardt, Wurttemberg, Germany
Filed Sept. 5, 1957, Ser. No. 682,183
Claims priority, application Germany Oct. 15, 1955
3 Claims. (Cl. 320—53)

This invention relates to pocket flashlights and like low current-utilizing devices, and in particular to rechargeable devices of this type. The instant application is a continuation-in-part of my copending U.S. patent application Serial No. 568,800, filed March 1, 1956, now U.S. Patent 2,880,306.

There are known pocket flashlights or similar low current-consuming devices which are provided with a secondary cell or storage battery to supply current to the actual light source, the storage battery being arranged in one and the same flashlight housing together with a corresponding charging circuit or system which can be connected to a current supply line or like power source for charging purposes. Prior flashlights using rechargeable batteries have not met with appreciable commercial success, notwithstanding the advantage of a rechargeable battery of indefinite life, because they had many drawbacks. They were bulky and heavy. They used either a transformer for reducing the voltage to the value required for charging the battery, which transformer is necessarily massive and rather expensive, or else they used devices which generated a very large amount of heat. Accordingly, precautions had to be taken to dissipate the heat and it was impractical to permanently enclose the charging circuit in a small casing and particularly in a plastic casing.

An object of the present invention is to provide in a flashlight having a rechargeable storage battery, a charging circuit permanently connected thereto which is of negligible weight and requires a very small space and which furthermore generates so little heat during the charging process that it can be permanently enclosed in a very small plastic casing. A feature of the invention is the reduction of a 120 volt or 220 volt alternating current input to the very small voltage required for charging the flashlight battery by means of a small capacitor which generates practically no heat. One or more solid metallic rectifiers, at least one of which is connected in series with the battery are used for rectifying the alternating voltage. A small resistor in series with the charging circuit limits surge currents to a safe value for the rectifier. In a particular constructional form of such flashlight, as disclosed in my aforesaid copending application, there are provided for connection to the current supply line two rigid prongs which extend from one end of the housing and are covered by a removable cap-like part of the housing whenever the flashlight is not to be plugged into a socket for charging purposes. This removable cap is so shaped that only after it has been mounted on the prongs, which are affixed to the housing, does the housing assume its final, smooth-surfaced, interior-enclosing shape.

Another object of the present invention is the provision, for a cap-equipped flashlight or other low current-utilizing device in which a secondary cell or small storage battery and a charging system for charging the battery from a current supply line are accommodated in a common housing while the cap encloses the electric plug-like prongs whenever no charging operation is taking place, of a different-type of prong-enclosing cap interchangeable with the first-mentioned cap and provided with specially constructed connector means as well as with a plurality of conductors at least one of which leads to one of the prongs.

Another important object of the invention is to provide a replacement cap or like housing part the external connector means of which can be constructed in a variety of forms. By way of example, it is possible to provide additional prongs spaced from one another or shaped with respect to one another in a manner different from the first set of prongs. Alternatively, it is possible to provide a counterpart or mating contact for any type of contact, e.g. threaded contact for screwing into a lamp socket, a socket element with bayonette locking means, a plug, especially a centered plug for use with a jack, a safety plug and the like.

Thus, a related important object of the present invention is to provide connector means, on such a flashlight housing cap, through the intermediary of which it is rendered possible to connect the charging system disposed in the interior of the flashlight housing to a variety of current sources. When it is desired to connect the charging system to a conventional D.C. power supply in an automotive vehicle, the connector means may advantageously be constructed as a centered plug.

In most cases, however, it is not sufficient to connect the wires or conductors leading from such specially constructed connector means of the replacement housing cap directly to the main prongs. Such a simplified, purely geometric adaptation of the prongs to the available power outlet suffices only when the same line voltage is available as that for which the main prongs are constructed, the only difference being in the different shaping of the contact surfaces. This condition is realized, for example, when the line voltage is to be taken not from an ordinary socket but rather from a lamp socket.

Accordingly, apart from the geometric adaptation to differently shaped contact surfaces, an electrical adaptation of the prongs to different power sources will generally be necessary. To this end, either certain circuit elements incorporated in the charging system must be shunted or cut out of the latter, or additional circuit elements must be employed and connected into the charging system.

It is an object of the present invention to provide means rendering it possible by mounting a single replacement cap on the main prongs to effect both the above-mentioned geometric and electrical adaptation of the prongs to the power source and to the outlet of the latter simultaneously. To this end, there is arranged in the replacement cap, besides the connector means, a contact element which is either directly or indirectly connected to one of the contact surfaces of the connector means. Upon mounting of the replacement cap on the main prongs, this contact element engages a cooperating contact on the housing from which a conductor leads to a predetermined point in the charging circuit. Depending on the construction selected, individual ones of the charging circuit elements can be bridged or shunted at least partly, which is especially necessary in the case of voltage dividing circuit elements upon connection of the charging system to a power source in which the line voltage is less than that for which the original charging arrangement was designed. If, for example, the charging circuit, which is designed for connection to an A.C. power source, includes a voltage divider composed of active and reactive or wattless resistances, then the reactive resistance, e.g. a capacitor, may be short-circuited whenever connection to the D.C. power supply of an automobile is effected.

It is further possible, in an analogous manner, to incorporate in the conductor between the external connector means of the replacement cap and the contact element thereof additional circuit elements. This may become necessary particularly in the event that connection is to be made to a current supply line or power source having a higher voltage or different line frequency than that for which the main prongs and charging system were initially designed, which may necessitate connecting into the circuit additional active or reactive resistances. Similar circuit elements may, of course, be provided in the conductor leading from the cooperating contact on the housing to the input terminal of the charging circuit.

In all of such arrangements it is generally permissible to connect one terminal of the power source directly to one terminal of the charging circuit. The construction may, therefore, be so chosen that, upon mounting of the replacement cap or like housing part on the main prongs, one contact surface of the connector means is directly connected to one of the main prongs.

The foregoing and other objects and advantages of the present invention will be more fully understood from the following detailed description which is to be read in conjunction with the accompanying drawing, in which.

Figure 1:
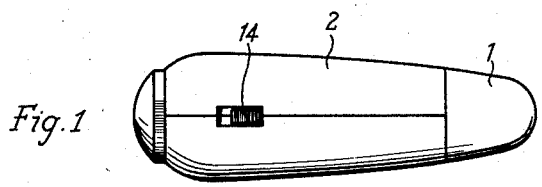
FIG. 1 is a side view of a rechargeable flashlight having a removable prong-covering cap as shown in my aforesaid copending application.
Figure 2:
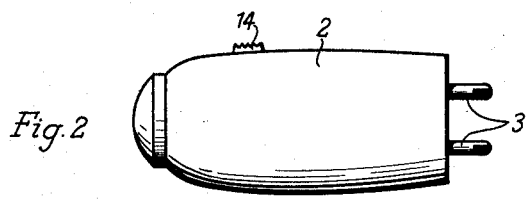
FIG. 2 is a plan view of the flashlight of FIG. 1 with the cap removed to bare the prongs.

Referring now more particularly to the drawing, it will be seen that the flashlight shown in FIGS. 1 and 2 corresponds essentially to that disclosed in my copending application and includes a multi-section housing 2 from one end of which project two rigid, electric plug-like prongs 3 which may be covered by a removable cap 1 provided with two appropriately shaped, prong-receiving recesses (not shown). The cap and housing may be made of inexpensive plastic materials. Whenever the flashlight is in use, the cap 1 is mounted on the prongs and thus completes the housing so as to make the same a smooth-surfaced, preferably conically or parabolically tapering entity.

Figure 3:
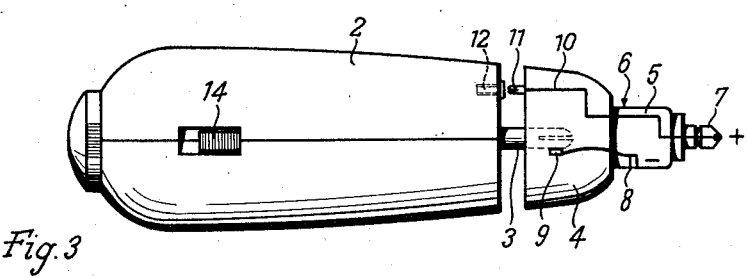
FIG. 3 is a side view of a rechargeable flashlight according to the invention with a replacement cap partially mounted on the prongs.

As is clearly shown in FIG. 3, the flashlight, when modified according to the present invention, includes in addition to the housing 2 and prongs 3 a replacement cap 4 substituted for the cap 1 and shown in partially mounted condition. Extending from the cap 4 is a centered plug 5 designed for connection to the power circuit of an automobile and provided with electrically conductive contact surfaces 6 and 7. A conductor 8 leads from the contact surface 6 to a sliding contact 9 which is positioned in one of the recesses in the cap for engagement with one of the prongs 3 upon mounting of the cap 4 on the prongs, to thereby connect the contact surface 6 directly to the negative terminal of the charging circuit.

A further conductor 10 leads from the second contact surface 7 to a contact element 11 which, in the illustrated embodiment of the invention, has the form of a prong adapted to be inserted into a sleeve or socket 12 constituting its cooperating contact on the housing 2. From the sleeve or socket 12 a lead or conductor 12a extends internally of the housing for the purpose of shunting or short-circuiting one or more of the circuit elements of the voltage divider of the charging circuit, as will be presently described.

Figure 4:
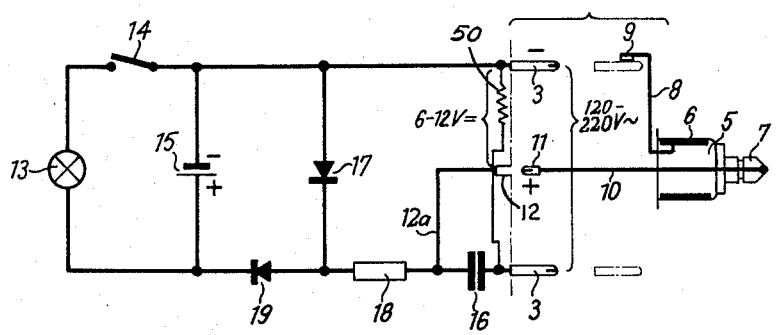
FIG. 4 is a diagram of the charging circuit for the flashlight of FIG. 3 including the replacement cap and its circuit elements.

As may be seen from FIG. 4, the light source 13 of the flashlight, e.g. an incandescent bulb, may be connected to and disconnected from its power source, a small storage battery 15, by means of a switch 14 accessible from the exterior of the housing 2 (see also FIG. 3). The storage battery 15 is connected to a charging system or circuit one part of which consists of a voltage divider constituted by a reactive resistance in the form of a capacitor 16, an asymmetrical resistance in the form of a dry metallic or selenium rectifier 17, and an ohmic current-limiting resistor 18, while another part of the charging system consists of a charging dry rectifier 19. The prongs 3 are connected to the capacitor 16 and to the input terminal of the dry rectifier 17, respectively, and are initially designed for connection to a standard 120–220 volts A.C. line. The conductor 12a by means of which the capacitor 16 may be shunted extends from the socket 12 to the junction between the capacitor and the resistor 18. In FIG. 4, the replacement cap 4 is shown with its contact 9 and prong 11 aligned with the corresponding prong 3 and socket 12 of the housing.

The operation of the circuit shown in FIG. 4 is as follows:

Assume that a 120 or 220 volt A.C. source is connected to prongs 3 by the insertion of the latter into a standard wall socket. When the lower prong 3 is at a positive voltage with respect to the upper prong, a current will flow through elements 16, 18, 19 and 15, thus charging the battery 15. The switch 14 may be in open or closed position so that the lamp 13 may be off or on during the charging. Capacitor 16 becomes charged to the peak voltage of the positive half cycle of the wave applied to the lower prong 3 and discharges through rectifier 17 after the peak voltage is passed. During the next half cycle when the upper prong 3 is positive with respect to the lower prong a current flows through rectifier 17, resistor 18 and capacitor 16. While this half cycle is rising to its peak, capacitor 16 is charged in the opposite direction substantially to the peak voltage. After the peak voltage has been passed capacitor 16 discharges at least partially through resistor 18, rectifier 19 and battery 15. The voltages produced across rectifiers 17 and 19 are of the order of about two volts, hence these rectifiers guard each other against excessive back voltages. If the prongs 3 were connected to the voltage source at the instant of a voltage peak, a peak voltage possibly as high as 310 volts might be applied to the rectifiers producing a destructively high current surge, if the resistor 18 were not present. The resistor 18 has a value sufficient for limiting the maximum possible current surges to a safe value.

As disclosed in my previously mentioned application, a high ohmic discharge resistance 50 may be connected directly between the prongs 3. The resistor 50 is designed to prevent possible electrical shocks to the user of the flashlight when the contact pins or prongs 3 are pulled out of the socket. In other words the resistor 50 serves to close the discharge path around capacitor 16 so as to discharge the capacitor when the flashlight is removed from the input source.

Substantially the entire voltage reduction of the high alternating input voltage is produced by the capacitor 16. This voltage reduction will not be accompanied by any appreciable amount of heat. For this reason and in view of the fact that only a few very small circuit elements are required it is possible to enclose the entire charging circuit and the batteries permanently in a small plastic casing without danger of causing excessive heat within the casing. The device has the advantage of always being immediately available for use since the battery is permanently connected to the charging circuit and the charging can be effected merely by plugging the device into a wall socket without any switching or other provisions. If desired the lamp may be kept lit during the charging process by closing the switch 14 and when the device is removed from the wall socket the lamp will remain lit.

Upon mounting of the cap 4 on the prongs 3 so as to transform the housing and cap into a single entity, the negative terminal of the charging circuit is brought into electrical connection with the contact surface 6 of the plug 5 via one of the prongs 3, the sliding contact 9 and the conductor 8. The positive terminal of the charging circuit, which is constituted by the socket 12 whenever the capacitor 16 must be shunted out due to connection of the flashlight to the 6 or 12 volts D.C. power supply of an automobile, is connected via the prong 11 and conductor 10 with the second surface 7 of the plug 5. In this manner, the originally relatively small voltage divider ratio is substantially increased, so that a charging current of sufficient magnitude is enabled to flow. The shunting of the capacitor 16 is, of course, what renders the charging circuit usable with a direct current power source.

The hereinabove described invention may be equally well applied to low current-consuming devices other than pocket flashlights, for example flash devices for cameras, which flash devices are provided with a rechargeable storage battery and a charging circuit therefor mounted in a common housing equipped with connector means for connection to a power source.

Other changes and modifications may also be made without departing in any way from the scope of the present invention, and it is intended that such changes and modifications be embraced by the appended claims.

I claim:

1. In an alternating current flashlight storage battery, charging apparatus of minimum size and arranged to generate a minimum amount of heat during charging, so that the apparatus may be housed in the casing of the flashlight, said apparatus being permanently operatively connected to said batteries so that said battery constitutes the entire load for said apparatus, and comprising a pair of input terminals adapted to be inserted in alternating current wall sockets, capacitive impedance means for reducing the alternating voltage at said input terminals to the value required for charging the battery, a solid dry diode rectifier serially connected between the capacitive impedance means and one terminal of the battery, the capacitive reaction of said impedance means being of such a magnitude that the predominant part of the voltage reduction occurs across the capacitive reactance, so that said voltage reduction is produced substantially without heat, an element having resistance connected from a point between said rectifier and capacitive reactance to the other terminal of the battery so that the voltage for the rectifier is tapped off across the resistance element, a resistance connected in series with the capacitive reactance and the rectifier having a magnitude sufficient for limiting the maximum current through the rectifier to a safe value, and a resistor connected directly between the input terminals for discharging the capacitive impedance when the input terminals are disconnected from the source of power.

2. A circuit for charging a relatively low voltage storage battery from an alternating current source of the order of 110 volts, comprising said battery, a pair of input terminals, dry metallic diode rectifier means, voltage peak-limiting resistor means, and voltage-dropping capacitor means all permanently connected in series with one another, and means for limiting the reverse voltage applied to said rectifier means to a relatively low voltage, said limiting means comprising another dry metallic diode rectifier, which with respect to the input terminals is poled reversely to said rectifier means, said other rectifier and said rectifier means being serially connected with said battery, said capacitor means having a capacity of such small size that substantially the entire voltage reduction is produced thereby substantially without the generation of heat, and resistive means for completing a direct current shunt path around said capacitor means when the input terminals are disconnected from said source.

3. In a flashlight storage battery charging apparatus of minimum size and arranged to generate a minimum amount of heat during charging, so that the apparatus may be housed in a completely closed pocket flashlight casing of minimum size, said apparatus comprising a load consisting solely of a storage battery; a pair of alternating current input terminals; capacitance impedance means for reducing the relatively high alternating voltage at said input terminals to the magnitude required for charging the battery; a solid dry diode rectifier serially connected with the capacitive reactance of the impedance means, the battery and the input terminals, with a direct current connection from one terminal of the rectifier to one terminal of the battery; and a second solid diode rectifier poled reversely to the first-mentioned rectifier with respect to the input terminals and connected from the other terminal of the battery to the other terminal of said first rectifier so that the voltage for the first rectifier is tapped off across said second rectifier; the capacitive reactance of said impedance means being of such a magnitude that the predominant part of the voltage reduction occurs thereacross, so that said voltage reduction is produced substantially without heat, a current limiting resistance connected in series with the capacitive reactance and each rectifier, said current limiting resistance being sufficient to limit the maximum current through both rectifiers to a safe value, and resistive means connected directly to the capacitive impedance for discharging the capacitive impedance when the input terminals are disconnected from the source of power.

References Cited in the file of this patent

UNITED STATES PATENTS

| 691,144 | Hutchinson | Jan. 14, 1902 |
| 1,729,753 | Stryker et al. | Oct. 1, 1929 |
| 2,213,199 | Bouwers | Sept. 3, 1940 |
| 2,301,115 | Gilbert | Nov. 3, 1942 |
| 2,410,527 | Schinske | Nov. 5, 1946 |
| 2,552,203 | Morgan | May 8, 1951 |
| 2,555,305 | Alty | June 5, 1951 |
| 2,576,938 | Hiatt | Dec. 4, 1951 |
| 2,591,131 | Brus | Apr. 1, 1952 |
| 2,628,339 | Werner | Feb. 10, 1953 |
| 2,642,520 | Coolidge et al. | June 16, 1953 |
| 2,853,635 | Nunn | Sept. 23, 1958 |
| 2,880,306 | Witte | Mar. 31, 1959 |

FOREIGN PATENTS

| 631,992 | Germany | July 1, 1936 |
| 730,137 | Germany | Jan. 7, 1943 |
| 732,431 | Germany | Mar. 3, 1943 |
| 750,071 | France | May 15, 1933 |
| 975,082 | France | Oct. 11, 1950 |

OTHER REFERENCES

"Mechanical Engineers' Handbook," Marks (4th. ed.), 1941.

Ser. No. 427,480, Zdansky (A.P.C.), published June 15, 1943.

"Radio Amateurs' Worksheet," C.Q., June 1945.

"Principles of Radio," Henney, (5th. ed.), 1945.

"Direct and Alternating Currents," Loew (3rd. ed.), 1946.

"Electrical Engineering Theory and Practice," vol. 1, Kemp, 1950.

"Telecommunications Principles," Renton, 1950.

"Radio and Television Engineers' Reference Book," Malloy, 1954.

"Voltage Reducing Rectifier Circuits," W. R. Koch, Jan. 5, 1959.